US010990703B2

(12) United States Patent
Rocci et al.

(10) Patent No.: US 10,990,703 B2
(45) Date of Patent: Apr. 27, 2021

(54) CLOUD-CONFIGURABLE DIAGNOSTICS VIA APPLICATION PERMISSIONS CONTROL

(71) Applicant: FORD GLOBAL TECHNOLOGIES, LLC, Dearborn, MI (US)

(72) Inventors: Benjamin M. Rocci, Ann Arbor, MI (US); Christian Krozal, South Lyon, MI (US); Mark Anthony Rockwell, Royal Oak, MI (US); David Randolph Roberts, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 16/191,809

(22) Filed: Nov. 15, 2018

(65) Prior Publication Data

US 2020/0159943 A1 May 21, 2020

(51) Int. Cl.
*G06F 21/62* (2013.01)
*G07C 5/08* (2006.01)
*G07C 5/00* (2006.01)

(52) U.S. Cl.
CPC .......... *G06F 21/629* (2013.01); *G07C 5/008* (2013.01); *G07C 5/0808* (2013.01); *G06F 2221/2141* (2013.01)

(58) Field of Classification Search
None
See application file for complete search history.

(56) References Cited

U.S. PATENT DOCUMENTS

| 10,489,132 | B1* | 11/2019 | Bloomcamp | G06F 8/61 |
|---|---|---|---|---|
| 2001/0020902 | A1* | 9/2001 | Tamura | G01C 21/3697 340/905 |
| 2002/0188854 | A1* | 12/2002 | Heaven | H04L 63/0861 713/186 |
| 2005/0005094 | A1* | 1/2005 | Jamieson | H04L 63/0807 713/155 |
| 2010/0293094 | A1* | 11/2010 | Kolkowitz | G06Q 20/401 705/44 |
| 2016/0094529 | A1* | 3/2016 | Mityagin | H04L 63/08 726/7 |
| 2017/0058811 | A1* | 3/2017 | Misson | F02D 41/2487 |
| 2017/0116405 | A1* | 4/2017 | Samzelius | G06F 3/023 |
| 2017/0162191 | A1* | 6/2017 | Grost | G10L 15/075 |
| 2018/0088931 | A1* | 3/2018 | Caushi | H04L 67/1097 |

* cited by examiner

*Primary Examiner* — William J. Goodchild
(74) *Attorney, Agent, or Firm* — Michael J. Spenner; Brooks Kushman P.C.

(57) ABSTRACT

A processor of a vehicle is programmed to send a message to a mobile device connected to the processor to request an application permissions update for the vehicle from a remote server, responsive to the vehicle lacking application permissions for a vehicle-enabled mobile application executed by a mobile device. The processor is further programmed to receive, from the server, the application permissions update including both the application permissions and a diagnostic request to receive data from the vehicle.

17 Claims, 6 Drawing Sheets

CLOUD-CONFIGURABLE DIAGNOSTICS VIA APPLICATION PERMISSIONS CONTROL

TECHNICAL FIELD

Aspects of the disclosure generally relate to leveraging an application permissions control system for use in providing cloud-configurable diagnostics. More specifically, the disclosed systems and methods provide an ability to offload diagnostic data from vehicles via a smartphone or other device without the presence of an application on the device explicitly designed to do so.

BACKGROUND

A system for allowing vehicle-enabled mobile applications to be executed on vehicle systems may allow for third-party applications to integrate with the vehicle. By doing so, the third-party applications may be controllable via the human-machine interface (HMI) of the vehicle. However, some third-party applications may not be suitable for use when the vehicle is in motion, or may be restricted according to government regulations. Moreover, some third-party applications may attempt to retrieve information unnecessary for application operation, causing potential user privacy concerns.

It may be desirable to receive diagnostics from vehicles. However, users may be unlikely to install a diagnostic application onto their mobile devices to allow other parties to receive data from the vehicle.

SUMMARY

In one or more illustrative examples, a system includes a processor of a vehicle programmed to send a message to a mobile device connected to the processor to request an application permissions update for the vehicle from a remote server, responsive to the vehicle lacking application permissions for a vehicle-enabled mobile application executed by a mobile device; and receive, from the server, the application permissions update including both the application permissions and a diagnostic request to receive data from the vehicle.

In one or more illustrative examples, a method includes sending, from a mobile device to a vehicle, application permissions and a diagnostic request both received from a server, the application permissions defining which vehicle features are accessible to a mobile application; executing the mobile application with the vehicle per the application permissions; and sending, to the server, results of the diagnostic request received from the vehicle in a message including metadata regarding actual vehicle function usage of the mobile application.

In one or more illustrative examples, a system includes a permissions cloud server programmed to receive a request for updated application permissions from a vehicle via a mobile device, responsive to determining that a request for diagnostics is pending for the vehicle, include a request for the diagnostics in a response to the request for updated application permissions, and send the response to the request for updated permissions to the mobile device to provide to the vehicle.

DETAILED DESCRIPTION

Figure 1:
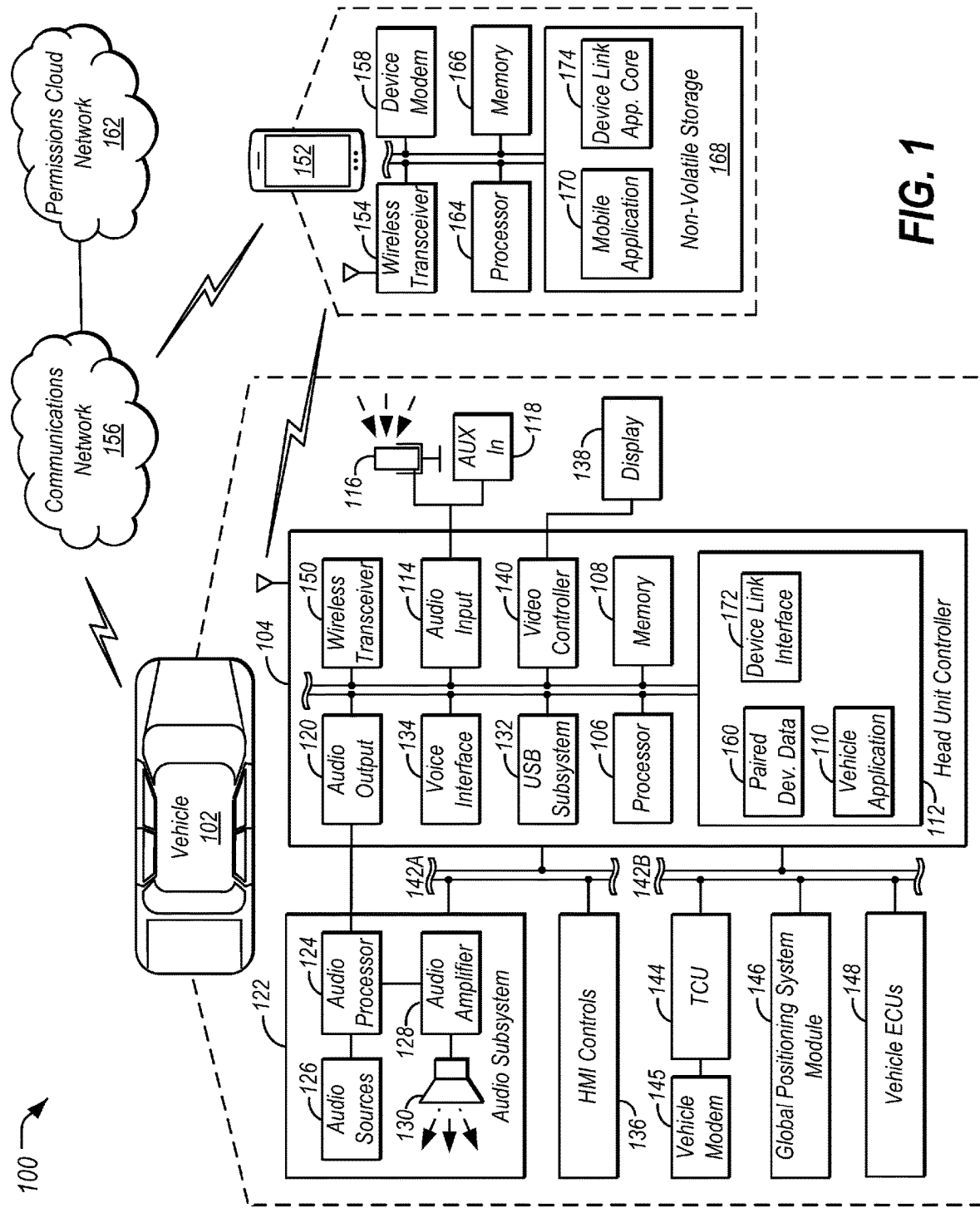
FIG. 1 illustrates an example diagram of a system configured to provide telematics services to a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Currently there is no way to offload vehicle data via a brought-in mobile device unless the device has an app installed which has been specifically designed (at least in part) to request certain data from the vehicle. This limitation means that there are thousands of lost opportunities each day (in the form of connections between a device and a vehicle) to offload vehicle data. Thus, it would be beneficial to leverage existing connections between a mobile device and the vehicle for the purpose of vehicle data offload.

A vehicle mobile application permissions system may utilize a cloud server to control what applications are allowed to interface with the vehicle, as well as how the applications are allowed to interface with the vehicle. As some examples, these permissions may include what data can be accessed by the application, what or how the application is allowed to access the vehicle human-machine interface (HMI), whether use of voice commands is allowed, and so on. When the vehicle recognizes a connection with a device installed with a vehicle-enabled application, the vehicle checks in with the cloud server via the mobile device to request a set of permissions or application programming interfaces (APIs) for that particular vehicle-enabled application which define how the application may interact with the vehicle systems. Additionally, responsive to the vehicle-enabled application interacting with the vehicle, the vehicle periodically sends metadata to the cloud server via the mobile device. This metadata may include information regarding what vehicle-enabled applications are running, whether the applications are open in the vehicle HMI or operating in the background, and possibly other information.

The cloud server may be utilized to send diagnostic data requests to vehicles in addition to performing the function of permissions control for vehicle-enabled applications. When a vehicle-enabled application communicates to the vehicle and the vehicle checks in with the cloud sever (via the mobile device), the cloud server may, in addition to replying to the vehicle with a set of application permissions, send the vehicle a set of diagnostic requests for vehicle data that have been configured for the vehicle. In an example, these diagnostic requests may include specification of one or more DTCs or DIDs. The vehicle may communicate via the vehicle network to execute these diagnostic requests. The results may be aggregated by the vehicle and sent back to the cloud server. For instance, this data may be returned the next time that an application permissions request is made, or the next time a vehicle-enabled application metadata transmission occurs.

Accordingly, a vehicle-to-cloud communication channel may be used to collect diagnostic data, thereby leveraging thousands of daily device-to-vehicle interactions for the benefit vehicle engineers or other requesters of diagnostic data.

FIG. 1 illustrates an example diagram of a system 100 configured to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

A head unit controller 104 may include one or more memories 108 and one or more processors 106 configured to perform instructions, commands, and other routines in support of the processes described herein. For instance, the head unit controller 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the head unit controller 104. Computer-executable instructions may be compiled or interpreted from computer programs created using a variety of programming languages and/or technologies, including, without limitation, and either alone or in combination, Java, C, C++,C #, Objective C, Fortran, Pascal, Java Script, Python, Perl, and PL/SQL.

The head unit controller 104 may be provided with various features allowing the vehicle occupants to interface with the head unit controller 104. For example, the head unit controller 104 may include an audio input 114 configured to receive spoken commands from vehicle occupants through a connected microphone 116, and an auxiliary audio input 118 configured to receive audio signals from connected devices. The auxiliary audio input 118 may be a physical connection, such as an electrical wire or a fiber optic cable, or a wireless input, such as a BLUETOOTH audio connection or Wi-Fi connection. In some examples, the audio input 114 may be configured to provide audio processing capabilities, such as pre-amplification of low-level signals, and conversion of analog inputs into digital data for processing by the processor 106.

The head unit controller 104 may also provide one or more audio outputs 120 to an input of an audio module 122 having audio playback functionality. In other examples, the head unit controller 104 may provide platform audio from the audio output 120 to an occupant through use of one or more dedicated speakers (not illustrated). The audio output 120 may include, as some examples, system generated chimes, pre-recorded chimes, navigation prompts, other system prompts, or warning signals.

The audio module 122 may include an audio processor 124 configured to perform various operations on audio content received from a selected audio source 126 and to platform audio received from the audio output 120 of the head unit controller 104. The audio processors 124 may be one or more computing devices capable of processing audio and/or video signals, such as a computer processor, microprocessor, a digital signal processor, or any other device, series of devices or other mechanisms capable of performing logical operations. The audio processor 124 may operate in association with a memory to execute instructions stored in the memory. The instructions may be in the form of software, firmware, computer code, or some combination thereof, and when executed by the audio processors 124 may provide audio recognition and audio generation functionality. The instructions may further provide for audio cleanup (e.g., noise reduction, filtering, etc.) prior to the processing of the received audio. The memory may be any form of one or more data storage devices, such as volatile memory, non-volatile memory, electronic memory, magnetic memory, optical memory, or any other form of data storage device.

The audio subsystem may further include an audio amplifier 128 configured to receive a processed signal from the audio processor 124. The audio amplifier 128 may be any circuit or standalone device that receives audio input signals of relatively small magnitude, and outputs similar audio signals of relatively larger magnitude. The audio amplifier 128 may be configured to provide for playback through vehicle speakers 130 or headphones (not illustrated).

The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the head unit controller 104, such as audio content generated by the head unit controller 104, audio content decoded from flash memory drives connected to a universal serial bus (USB) subsystem 132 of the head unit controller 104, and audio content passed through the head unit controller 104 from the auxiliary audio input 118. For instance, the audio sources 126 may also include Wi-Fi streamed audio, USB streamed audio, BLUETOOTH streamed audio, internet streamed audio, TV audio, as some other examples.

The head unit controller 104 may utilize a voice interface 134 to provide a hands-free interface to the head unit controller 104. The voice interface 134 may support speech recognition from audio received via the microphone 116 according to a standard grammar describing available command functions, and voice prompt generation for output via the audio module 122. The voice interface 134 may utilize probabilistic voice recognition techniques using the standard grammar in comparison to the input speech. In many cases, the voice interface 134 may include a standard user profile tuning for use by the voice recognition functions to allow the voice recognition to be tuned to provide good results on average, resulting in positive experiences for the maximum number of initial users. In some cases, the system may be configured to temporarily mute or otherwise override the audio source specified by an input selector when an audio prompt is ready for presentation by the head unit controller 104 and another audio source 126 is selected for playback.

The microphone 116 may also be used by the head unit controller 104 to detect the presence of in-cabin conversations between vehicle occupants. In an example, the head unit controller 104 may perform speech activity detection by filtering audio samples received from the microphone 116 to a frequency range in which first formants of speech are typically located (e.g., between 240 and 2400 HZ), and then applying the results to a classification algorithm configured to classify the samples as either speech or non-speech. The classification algorithm may utilize various types of artificial intelligence algorithm, such as pattern matching classifiers, K nearest neighbor classifiers, as some examples.

The head unit controller 104 may also receive input from human-machine interface (HMI) controls 136 configured to provide for occupant interaction with the vehicle 102. For instance, the head unit controller 104 may interface with one or more buttons or other HMI controls configured to invoke functions on the head unit controller 104 (e.g., steering wheel audio buttons, a push-to-talk button, instrument panel controls, etc.). The head unit controller 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The head unit controller 104 may be further configured to communicate with other components of the vehicle 102 via one or more in-vehicle networks 142. The in-vehicle networks 142 may include one or more of a vehicle controller area network (CAN), an Ethernet network, and a media-oriented system transfer (MOST), as some examples. The in-vehicle networks 142 may allow the head unit controller 104 to communicate with other vehicle 102 systems, such as a telematics control unit 144 having an embedded modem 145, a global positioning system (GPS) module 146 configured to provide current vehicle 102 location and heading information, and various vehicle electronic control units (ECUs) 148 configured to cooperate with the head unit controller 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors, and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the head unit controller 104 over a first in-vehicle network 142-A, and the telematics control unit 144, GPS module 146, and vehicle ECUs 148 may communicate with the head unit controller 104 over a second in-vehicle network 142-B. In other examples, the head unit controller 104 may be connected to more or fewer in-vehicle networks 142. Additionally or alternatively, one or more HMI controls 136 or other components may be connected to the head unit controller 104 via different in-vehicle networks 142 than shown, or directly without connection to an in-vehicle network 142.

The head unit controller 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the head unit controller 104. In many examples, the head unit controller 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the head unit controller 104 may communicate with the mobile device 152 over a wired connection, such as via a USB connection between the mobile device 152 and the USB subsystem 132. In some examples, the mobile device 152 may be battery powered, while in other cases the mobile device 152 may receive at least a portion of its power from the vehicle 102 via the wired connection.

A communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the head unit controller 104 may be identified by the head unit controller 104 according to paired device data 160 maintained in the storage medium 112. The paired device data 160 may indicate, for example, the unique device identifiers of mobile devices 152 previously paired with the head unit controller 104 of the vehicle 102, such that the head unit controller 104 may automatically reconnected to the mobile devices 152 referenced in the paired device data 160 without user intervention.

When a mobile device 152 that supports network connectivity is paired with and connected to the head unit controller 104, the mobile device 152 may allow the head unit controller 104 to use the network connectivity of the device modem 158 to communicate over the communications network 156 with various remote computing devices. In one example, the head unit controller 104 may utilize a data-over-voice plan or data plan of the mobile device 152 to communicate information between the head unit controller 104 and the communications network 156. Additionally or alternately, the head unit controller 104 may utilize the telematics control unit 144 to communicate information between the head unit controller 104 and the communications network 156, without use of the communications facilities of the mobile device 152.

Similar to the head unit controller 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the head unit controller 104 via the wireless transceiver 154 and with various network services via the device modem 158.

A permissions cloud network 162 may include various types of computing apparatus, such as a computer workstation, a server, a desktop computer, a virtual server instance executed by a mainframe server, or some other computing system and/or device. Similar to the head unit controller 104, the one or more devices of the permissions cloud network 162 may include a memory on which computer-executable instructions may be maintained, where the instructions may be executable by one or more processors of the devices. As discussed in detail below, the permissions cloud network 162 may be configured to facilitate permission control and also provide diagnostic capabilities.

The head unit controller 104 may also include a device link interface 172 to facilitate the integration of functionality of the mobile applications 170 configured to communicate with a device link application core 174 executed by the mobile device 152. In some examples, the mobile applications 170 that support communication with the device link interface 172 may statically link to or otherwise incorporate the functionality of the device link application core 174 into the binary of the mobile application 170. In other examples, the mobile applications 170 that support communication with the device link interface 172 may access an application programming interface (API) of a shared or separate device link application core 174 to facilitate communication with the device link interface 172.

The integration of functionality provided by the device link interface 172 may include, as an example, the ability of mobile applications 170 executed by the mobile device 152 to incorporate additional voice commands into the grammar of commands available via the voice interface 134. The device link interface 172 may also provide the mobile applications 170 with access to vehicle information available to the head unit controller 104 via the in-vehicle networks 142. The device link interface 172 may further provide the mobile applications 170 with access to the vehicle display 138. An example of a device link interface 172 may be the SYNC APPLINK component of the SYNC system provided by The Ford Motor Company of Dearborn, Mich. Other examples of device link interfaces 172 may include MIRRORLINK, APPLE CARPLAY, and ANDROID AUTO.

Figure 2:
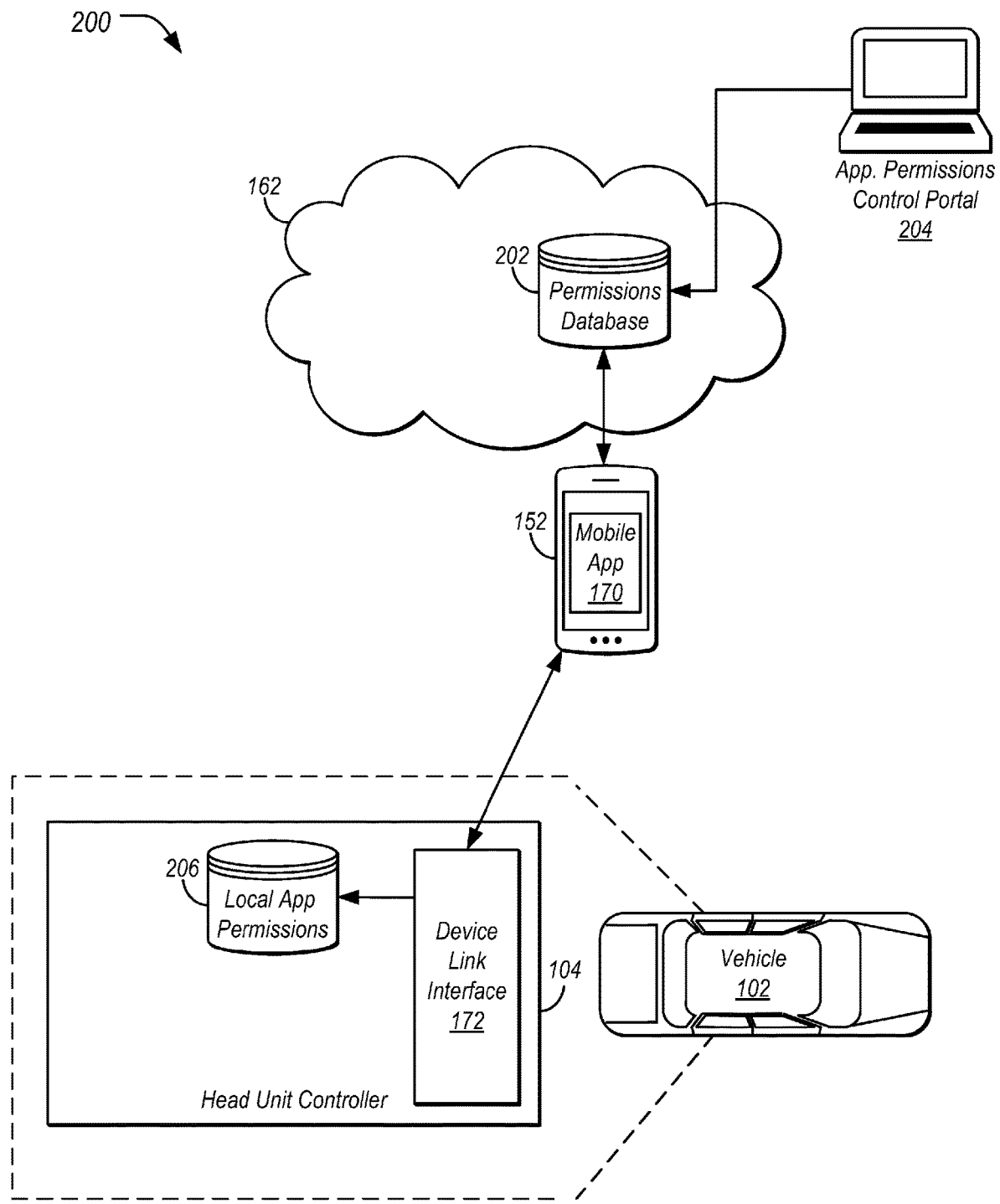
FIG. 2 illustrates a diagram for providing permissions data for use with mobile applications.

FIG. 2 illustrates a diagram 200 for providing permissions data for use with mobile applications 170. As shown, the permissions cloud network 162 controls what mobile applications 170 are allowed to interface with the vehicle 102 and how they are allowed to interface (e.g., what data they can access, what/how they are allowed to write to the HMI, use of voice commands, etc.). Responsive to the head unit controller 104 recognizing a connection with a mobile device 152 installed with a vehicle-enabled mobile application 170, the head unit controller 104 checks in with the permissions cloud network 162 via the mobile device 152 to ask for a set of permissions or APIs for that particular mobile application 170 which define how the mobile application 170 may interact with the vehicle 102 via the head unit controller 104. Further, when the mobile application 170 interacts with the head unit controller 104, the head unit controller 104 periodically sends metadata to the permissions cloud network 162 via the mobile device 152 which includes information about what mobile applications 170 are running, whether they are open in the head unit controller 104 human-machine interface (HMI) or operating in the background, and other usage statistics.

More specifically, the permissions cloud network 162 includes a permissions database 202 configured to receive configuration data from an application permissions control portal 204. The permissions database 202 may be provided by application included on the storage of one or more devices of the permissions cloud network 162. The permissions database 202 may include instructions that, when loaded into memory and executed, cause the permissions cloud network 162 to perform database functionality including the storage, update, and retrieval of relational information. Databases or data repositories such as the permissions database 202 may include various kinds of mechanisms for storing, accessing, and retrieving various kinds of data, including a hierarchical database, a set of files in a file system, an application database in a proprietary format, a relational database management system (RDBMS), etc. An RDBMS generally employs the known Structured Query Language (SQL) in addition to a language for creating, storing, editing, and executing stored procedures, such as the PL/SQL language mentioned above. The permissions database 202 may be configured to maintain information including the application permissions.

The permissions database 202 may be accessed via the permissions control portal 204. The permissions control portal 204 may be configured to provide an administrative interface (e.g., a secure web interface) through which the permissions database 202 may be maintained. In an example, the application permissions control portal 204 may include a web page provided by a server of the permissions cloud network 162. In an example, the permissions database 202 may be updated according to user input received by the permissions control portal 204. This input may be received, for example, from a connected application administrator considering third-party requests, customer feedback and other factors to set policies on a mobile application 170 by mobile application 170 basis.

The permissions cloud network 162 may also include an interface to the vehicle 102 that allows a policy table file to be passed between the permissions cloud network 162 and the vehicle 102. The policy table file may include information detailing application permissions in the vehicle 102 and information describing how and when the vehicle 102 should request permission updates. Additionally, the vehicle 102 may be configured to write usage information to the policy table file to return to the permissions cloud network 162 for reporting purposes.

The policy table file may be passed between the permissions cloud network 162 and the vehicle 102 via the user's mobile device 152 that is paired with the vehicle 102 and executing the mobile application 170. In an example, the file may be transferred to the vehicle 102 via the mobile device 152, by way of a response to a hypertext transport protocol (HTTP) request to a universal resource locator (URL) of a server of the permissions cloud network 162 associated with provisioning of vehicle application policies. In an example, the URL may be included in the policy table file. The policy table file may be encrypted and signed by the vehicle key to mitigate the possibility of man-in-the-middle attackers intercepting the data.

Each connected mobile application 170 installed to a user's paired mobile device 152 may be associated with an application identifier (e.g., provided from the vehicle 102 manufacturer or other identifier management authority). In an example, a management user having access to the application permissions control portal 204 may input the application's information, including allowed APIs and permissions, and may generate an application identifier for the requesting application.

Responsive to the mobile application 170 registering in-vehicle with the head unit controller 104 of the vehicle 102, the mobile application 170 passes along the application identifier. The head unit controller 104 may then check the local application permissions 206 for an application policy associated with the provided application identifier.

The application policy may dictate whether the mobile application 170 is allowed to run in the vehicle 102, and if so, which vehicle functions whose permission is controlled may be accessed by the mobile application 170. The head unit controller 104 may access local application permissions 206 to determine the permissions for the mobile application 170. If the local application permissions 206 do not contain policy permissions for the application identifier of the mobile application 170, the head unit controller 104 may request a policy table file update from the permissions cloud network 162. The policy table file update request may include the current policy table file of the vehicle 102 as well as the unknown application identifier. The policy table file update request may also include recorded mobile application 170 usage indicative of mobile application 170 usage of the vehicle 102 functions whose permission is controlled by the policy table file. The updated policy table file provided by the permissions cloud network 162 may include updated policy permissions, including a policy for the newly registered mobile application 170.

Figure 3:
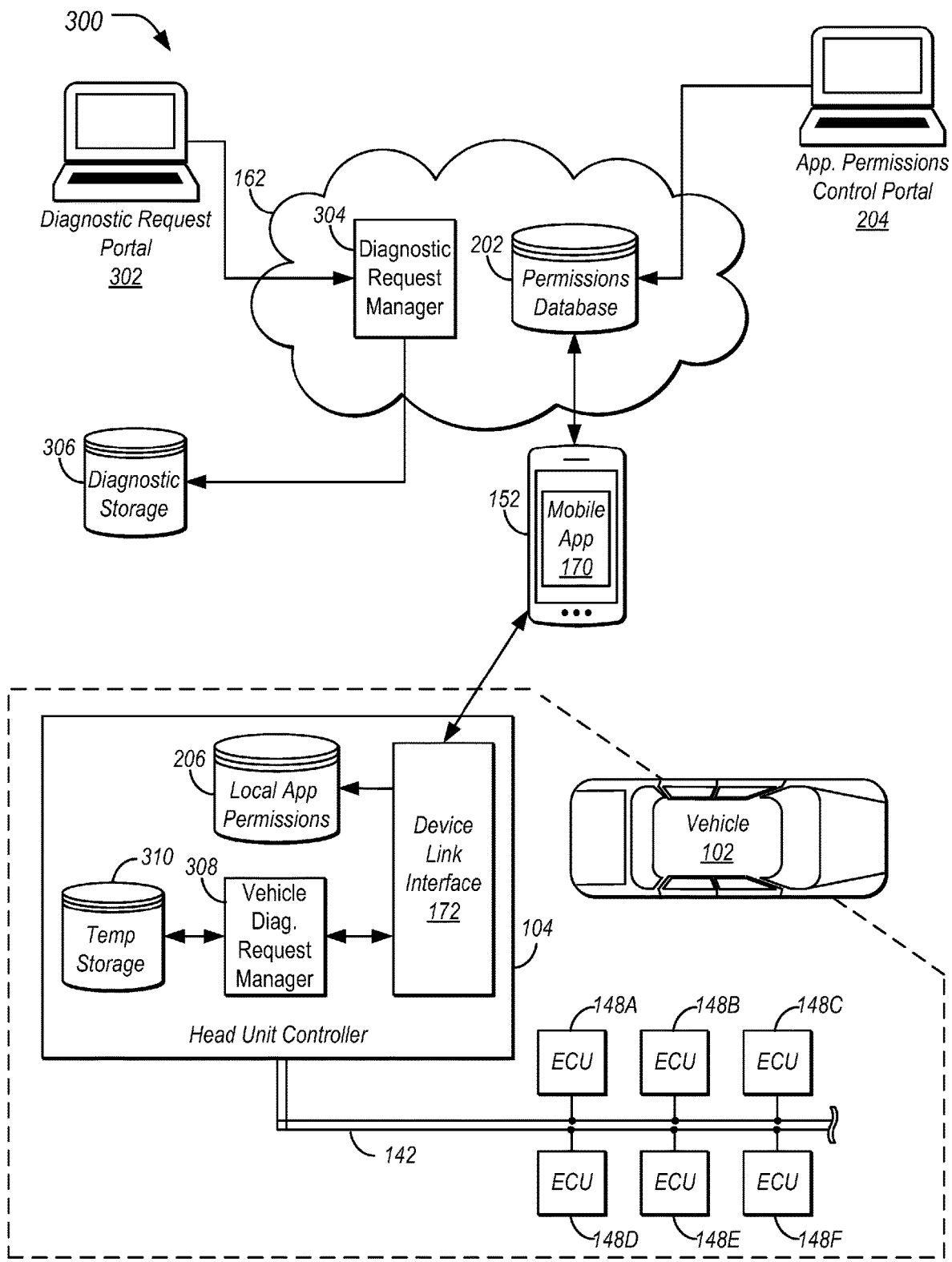
FIG. 3 illustrates a diagram for providing permissions data for use with mobile applications to request diagnostic data from vehicles.

FIG. 3 illustrates a diagram 300 for providing permissions data for use with mobile applications 170 to request diagnostic data from vehicles 102. In addition to the functionality described with regard to the diagram 200, the permissions cloud network 162 may be utilized to send diagnostic data requests to vehicles 102 in addition to performing its primary function of mobile application 170 permission control.

As shown in the diagram 300, a diagnostic request portal 302 may be configured to provide an administrative interface (e.g., a secure web interface) through which diagnostic requests may be received. In an example, the diagnostic request portal 302 may include a web page provided by a server of the permissions cloud network 162. A diagnostic request may be created by the diagnostic request portal 302 according to user input received by the diagnostic request portal 302. These diagnostic requests may be provided by the permissions cloud network 162 to a diagnostic request manager 304.

Responsive to a vehicle-enabled mobile application 170 communicating to the head unit controller 104, the head unit controller 104 may check in with the permissions cloud network 162 (via the mobile device 152). Responsive to the check-in, the permissions cloud network 162 may (in addition to replying to the head unit controller 104 with a set of application permissions) access the diagnostic request manager 304 to identify any requests to send to the vehicle 102. Accordingly, the permissions cloud network 162 may return to the head unit controller 104, in addition to the permission information, a set of diagnostic requests for vehicle 102 data including DTCs and DIDs that have been configured in permissions cloud network 162 via the diagnostic request portal 302. The DTCs and/or DIDs may be indicated as information to be monitored for in view of the diagnostic request.

The head unit controller 104 may receive the diagnostic requests, and may utilize a vehicle diagnostic request manager 308 to communicate those requests to other ECUs 148 via the one or more in-vehicle networks 142 to execute the diagnostic requests. The results may be aggregated by the vehicle diagnostic request manager 308 and stored in temporary storage 310 for later upload to the permissions cloud network 162. In an example, the diagnostic data may be sent back to the permissions cloud network 162 the next time that a mobile application permissions request or metadata transmission occurs from the vehicle 102 via the mobile device 152.

This diagnostic data may be provided by the permissions cloud network 162 to the diagnostic request manager 304, which may store the diagnostic data results to a diagnostic storage 306.

Figure 4:
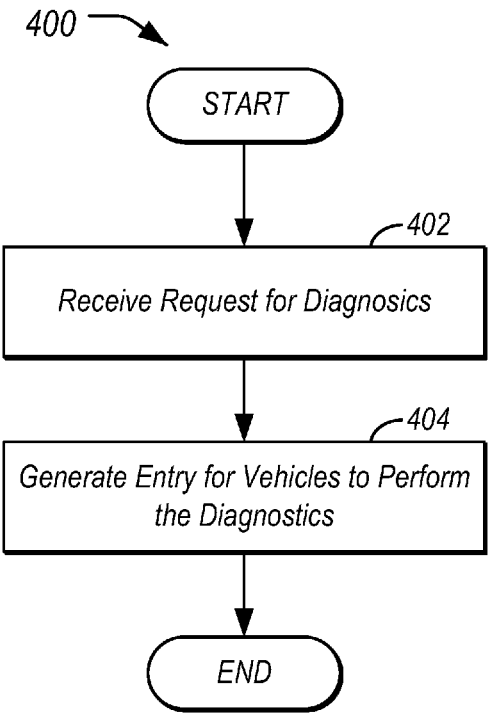
FIG. 4 illustrates an example process for receiving requests to perform vehicle diagnostics.

FIG. 4 illustrates an example process 400 for receiving requests to perform vehicle diagnostics. In an example, the process 400 may be performed by the permissions cloud network 162 in the context of the system 100.

At operation 402, the process 400 begins responsive to receipt of a request to the diagnostic request manager 304 of the permissions cloud network 162. In an example, the request for diagnostics may be entered via the diagnostic request portal 302. The request for diagnostics may include information regarding DTCs and/or DIDs for which data should be captured, as well as indications of which vehicles 102 should be used to capture the data. In one example, vehicles 102 may be specified by VIN or range of VIN. In another example, vehicles 102 may be specified by model or by included features (e.g., vehicles 102 having a particular ECU 148 function to be tested).

At operation 404, the permissions cloud network 162 stores the data for the diagnostic request in a data entry. The storage operation may be performed by the diagnostic request manager 304. In an example, the specified diagnostics to perform may be indexed by the indications of which vehicles 102 should perform the diagnostics. This information may be stored in the diagnostic storage 306 in one example, but may be stored elsewhere in a storage accessible by the diagnostic request manager 304. After operation 404, the process 400 ends.

Figure 5:
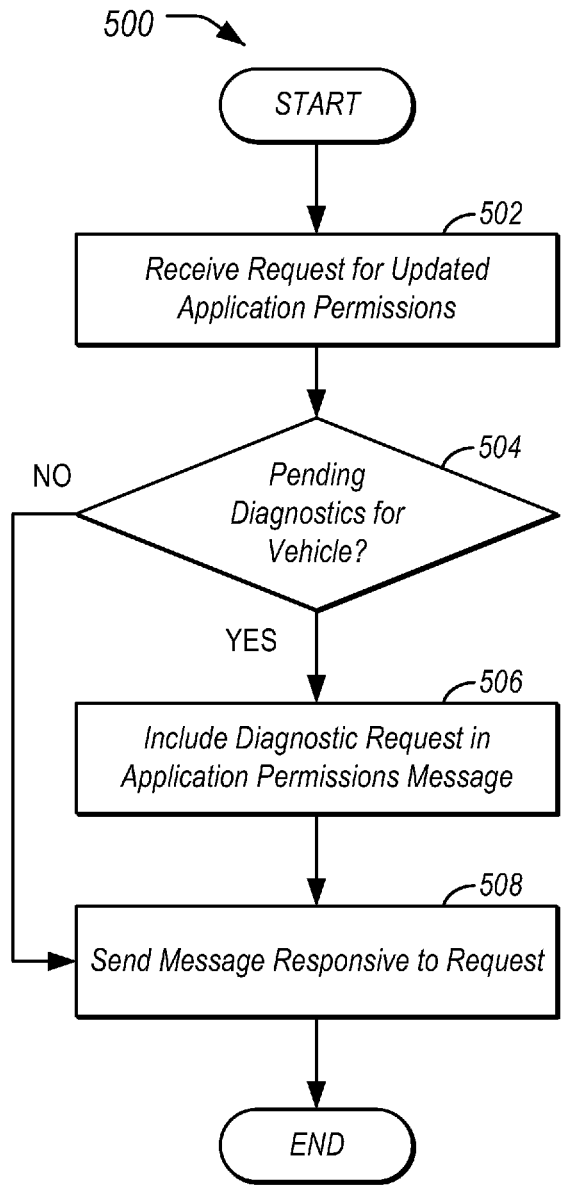
FIG. 5 illustrates an example process for including vehicle diagnostic requests in application permission updates.

FIG. 5 illustrates an example process 500 for including vehicle 102 diagnostic requests in application permission 206 updates. In an example, the process 500 may be performed by the permissions cloud network 162 in the context of the system 100.

At operation 502, the permissions cloud network 162 receives a request for updated application permissions from a vehicle 102. In an example, the request is sent from the vehicle 102 via a paired mobile device 152.

At operation 504, the permissions cloud network 162 determines whether there are pending requests for diagnostics for the vehicle 102. In an example, the diagnostic request manager 304 may access storage (e.g., the diagnostic storage 306) to identify whether any diagnostic requests are available to be performed by the vehicle 102 making the request for updated permissions. For instance, a VIN or other identifier of the vehicle 102 or configuration information regarding the vehicle 102 may be used to determine whether any of the stored diagnostic requests match the vehicle 102. If so, control passes to operation 506 to include the diagnostics request(s) in the application permissions message. The diagnostic request manager 304 may also mark the diagnostics as having been sent out to the vehicle, such that the vehicle 102 does not receive additional requests to perform the diagnostics. After operation 506, or if no diagnostics are requested at operation 504, control passes to operation 508. At operation 508, the permissions cloud network 162 sends the application permissions message responsive to the vehicle request. After operation 508, the process 500 ends.

Figure 6:
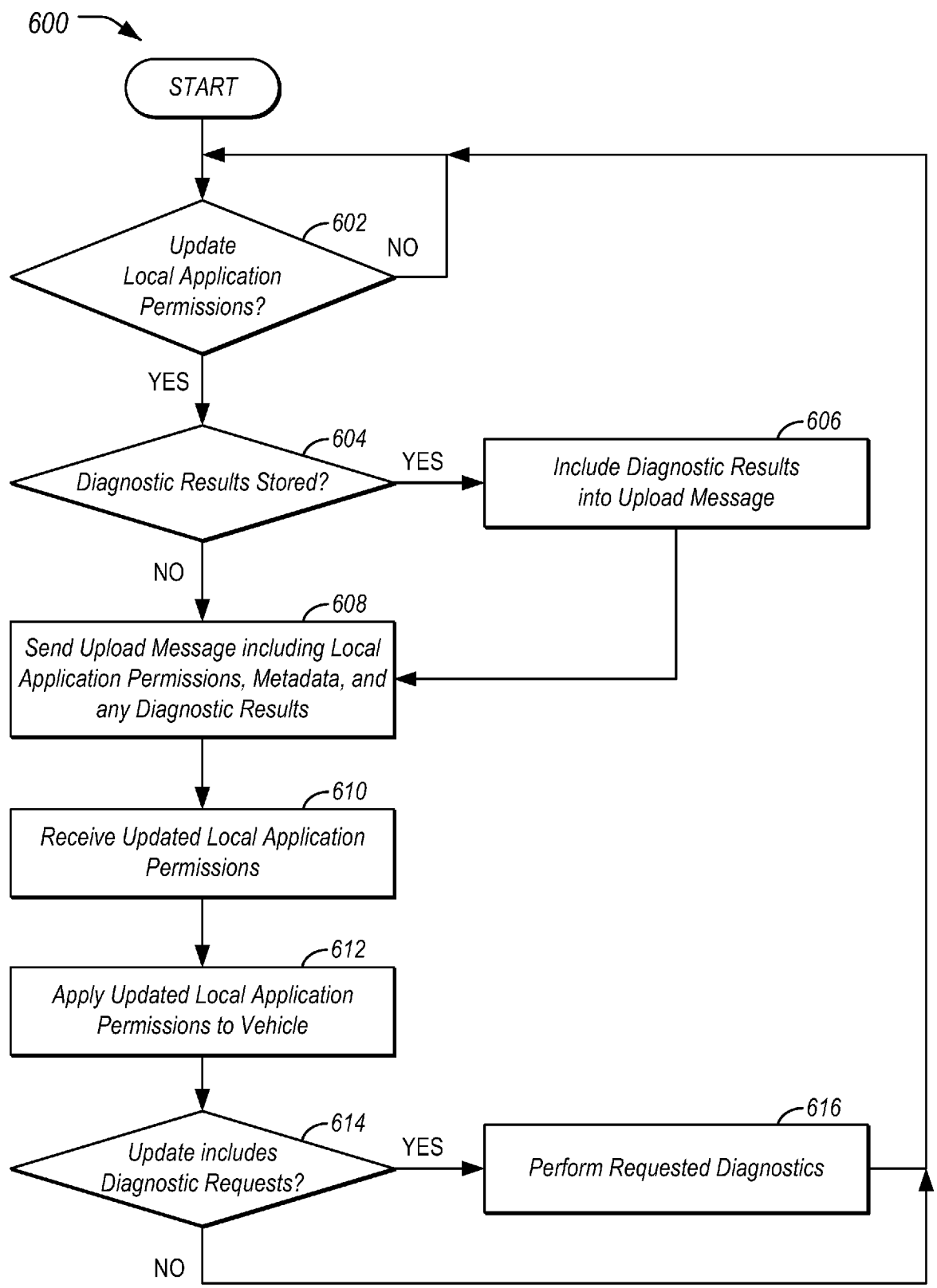
FIG. 6 illustrates an example process for providing vehicle diagnostics in the context of updating application permissions of the vehicle.

FIG. 6 illustrates an example process 600 for providing vehicle diagnostics in the context of updating application permissions 206 of the vehicle 102. In an example, the process 600 may be performed by the head unit controller 104 in the context of the system 100.

At 602, the head unit controller 104 determines whether an update to the local application permissions 206 is indicated. In an example, the head unit controller 104 may determine that the local application permissions 206 should be updated due to the head unit controller 104 identifying that the local application permissions 206 lacks application permissions associated with an application identifier of a mobile application 170 of the mobile device 152 attempting to use the head unit controller 104. In another example, the head unit controller 104 may determine that the local application permissions 206 should be updated based upon the vehicle 102 having reached a predetermined number of key-on cycles.

In an example, the head unit controller 104 may determine that the local application permissions 206 should be updated due to the head unit controller 104 identifying that an application identifier of a mobile application 170 is not listed in the local application permissions 206. In another example, the head unit controller 104 may determine that the local application permissions 206 should be updated responsive to the user starting a mobile application 170 that requires a local application permissions 206 update and the head unit controller 104 has not received updated local application permissions 206 over the initial request sequence. In yet further examples, the head unit controller 104 may determine that the local application permissions 206 should be updated after one or more of: 'N' ignition cycles (e.g., where 'N' is defined within the local application permissions 206), after 'M' kilometers have been recorded on the vehicle 102 odometer (e.g., where 'M' is defined within the local application permissions 206), after 'O' elapsed time e.g., where 'O' is defined within the local application permissions 206).

At operation 604, the head unit controller 104 determines whether the vehicle 102 has diagnostic results to send to the permissions cloud network 162. In an example, the head unit controller 104 may request the vehicle diagnostic request manager 308 to access the temporary storage 310 to identify whether any results of diagnostic requests have been stored for upload. If diagnostic requests have been stored, control passes to operation 606 to include the diagnostic results in the upload message. If not, control passes to operation 608.

At operation 608, the head unit controller 104 sends a metadata update message to the permissions cloud network 162. The metadata update may include recorded application usage information as well as diagnostic results, if available.

At operation 610, the head unit controller 104 receives an update to the local application permissions 206 from the permissions cloud network 162. The update may include new local application permissions 206 to augment or replace the current local application permissions 206 of the vehicle 102. The updated application permissions 206 may include the latest application permissions for the mobile applications 170 included in the local application permissions 206 sent to the permissions cloud network 162. The new local application permissions 206 may however, not include any recorded application usage.

At operation 612, the head unit controller 104 applies the updated local application permissions 206. Accordingly, the updated local application permissions 206 may be made available for use. After operation 608, the process 600 returns to operation 602.

At operation 614, the head unit controller 104 determines whether the update to the local application permissions 206 includes any diagnostic requests. In an example, the vehicle diagnostic request manager 308 of the head unit controller 104 may identify whether the update includes one or more diagnostic requests. If so, control passes to operation 616 to facilitate performance of the requested diagnostics. For example, the vehicle diagnostic requests manager 308 may schedule the diagnostic requests to be performed via one or more ECUs 148 of the vehicle 102 to receive data from the ECUs 148. The received diagnostic data may then be stored by the head unit controller 104 into the temporary storage 310 for upload to the permissions cloud network 162 in a future message to the permissions cloud network 162. After operations 614 or 616, control returns to operation 602.

Figure 7:
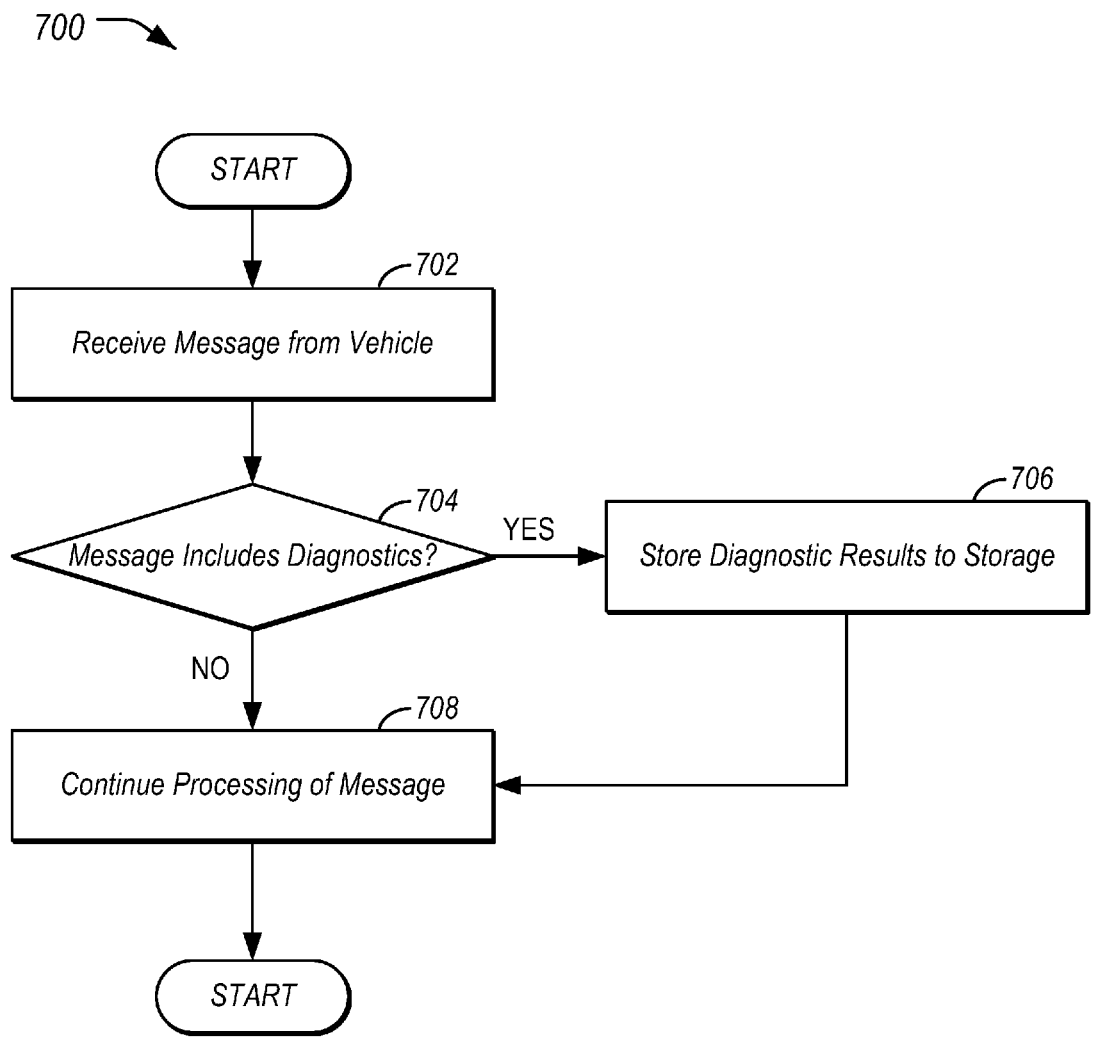
FIG. 7 illustrates an example process for receiving diagnostics from a vehicle in messaging from the vehicle to the permissions cloud network.

FIG. 7 illustrates an example process 700 for receiving diagnostics from a vehicle 102 in messaging from the vehicle 102 to the permissions cloud network 162. In an example, the process 700 may be performed by the permissions cloud network 162 in the context of the system 100.

At operation 702, the permissions cloud network 162 receives a message from a vehicle 102. In an example, this message may be a request for updated application permissions.

At operation 704, the permissions cloud network 162 determines whether the message includes diagnostics. In an example, the diagnostic request manager 304 may access the message to determine whether any diagnostics are indicated as being included in the message.

At operation 706, the permissions cloud network 162 stores the diagnostics. In an example, the diagnostic request manager 304 stores the received diagnostics to the diagnostic storage 306. In an example, this data may be indexed to an identifier of the vehicle 102 included in the message. In another example, the data may be indexed according to the diagnostic request (e.g., if the request is sent to many vehicles 102). The diagnostic request manager 304 may also mark the diagnostics as having been completed, such that the vehicle 102 does not receive additional requests to perform the diagnostics.

At operation 708, the permissions cloud network 162 continues processing of the message. This may include, in an example, providing requested application permissions to the vehicle 102. After operation 708, the process 700 ends.

Accordingly, the system 100 utilizes an existing vehicle 102 to cloud communication channel to collect diagnostic data. This allows for an ability to offload diagnostic data from vehicles 102 via the mobile device 152 using any vehicle-enabled application 170, such as a music-streaming application, a navigation application, a traffic application, a weather application, a personal-assistant application, a health and wellness application, or a productivity application, without the presence of a mobile application 170 on the device that is explicitly designed to perform diagnostics. Instead, diagnostics may be performed so long as any vehicle-enabled mobile application 170 is installed to the mobile device 152.

Computing devices described herein, such as the telematics controller 144, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, JAVA™, C, C++,C #, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A system comprising:
   a hardware processor of a vehicle programmed to
      send a message to a mobile device connected to the processor to request an application permissions update for the vehicle from a remote server, responsive to the vehicle lacking application permissions for a vehicle-enabled mobile application executed by a mobile device;
      receive, from the server, the application permissions update including both the application permissions as requested and also a diagnostic request to receive data from the vehicle, the diagnostic request being included as matching an identifier and/or a configuration of the vehicle requesting the application permissions update;
      provide the mobile application with access to the vehicle in accordance with the application permissions for the mobile application;
      execute the diagnostic request; and
      send diagnostic results of the diagnostic request to the server in a second message.

2. The system of claim 1, wherein the processor is further programmed to store diagnostic results to a temporary storage of the vehicle.

3. The system of claim 2, wherein the second message includes recorded application usage indicative of mobile application use of user interface features, information elements, and functions of the vehicle.

4. The system of claim 1, wherein the mobile application is one or more of: a music-streaming application, a navigation application, a traffic application, a weather application, a personal-assistant application, a health and wellness application, or a productivity application.

5. The system of claim 1, wherein the processor is further configured to, responsive to occurrence of at least one of a predetermined period of time, a predetermined number of key cycles, and a predetermined increase in vehicle odometer distance since the application permissions were updated, send an application usage update message to the mobile device configured to cause the mobile device to request updated application permissions from the server.

6. The system of claim 5, wherein the request for updated application permissions includes diagnostic results from execution of the diagnostic request.

7. A method comprising:
   sending, from a mobile device to a vehicle, application permissions and a diagnostic request both received from a server, the application permissions defining which vehicle features are accessible to a mobile application, the diagnostic request being included with the application permissions as matching an identifier and/or a configuration of the vehicle requesting the application permissions;
   executing the mobile application with the vehicle per the application permissions; and
   sending, to the server, results of the diagnostic request received from the vehicle in a message including metadata regarding actual vehicle function usage of the mobile application.

8. The method of claim 7, wherein the mobile application has a primary function separate from performance of vehicle diagnostics and does not indicate in a user interface that the mobile application facilitates vehicle diagnostics.

9. The method of claim 7, further comprising:
receiving a message from the vehicle to request an application permissions update for the vehicle from the server, responsive to the vehicle lacking application permissions for the mobile application; and
receiving the application permissions and a diagnostic request received from the server responsive to forwarding the message from the vehicle to the server.

10. The method of claim 7, wherein the diagnostic request indicates one or more diagnostic trouble codes (DTC) to be monitored for by the vehicle.

11. The method of claim 7, wherein the diagnostic request indicates one or more vehicle controllers to be monitored by the vehicle.

12. The method of claim 7, wherein the mobile application is one or more of: a music-streaming application, a navigation application, a traffic application, a weather application, a personal-assistant application, a health and wellness application, or a productivity application.

13. A system comprising:
a permissions cloud server programmed to:
receive a request for updated application permissions from a vehicle via a mobile device,
responsive to determining that a request for diagnostics is pending for the vehicle, include a request for the diagnostics in a response to the request for updated application permissions, the diagnostic request being included with the application permissions as matching an identifier and/or a configuration of the vehicle requesting the application permissions, and
send the response to the request for updated permissions to the mobile device to provide to the vehicle.

14. The system of claim 13, wherein the permissions cloud server is further programmed to receive a request for diagnostics for the vehicle from a diagnostic request portal, the portal receiving identifiers of diagnostics to be performed and identifiers of the vehicles onto which the diagnostics are to be performed.

15. The system of claim 13, further comprising a diagnostic storage, wherein the permissions cloud server is further programmed to store, to the diagnostic storage, results of the diagnostic request received from the vehicle in a message including metadata regarding vehicle function usage of mobile applications.

16. The system of claim 13, wherein the request for updated application permissions is received from a mobile application that is one or more of: a music-streaming application, a navigation application, a traffic application, a weather application, a personal-assistant application, a health and wellness application, or a productivity application.

17. The system of claim 13, wherein the request for updated application permissions includes diagnostic results from execution of a previous diagnostic request to the vehicle provided from the permissions cloud server.

* * * * *